US012556405B2

United States Patent
Ozga et al.

(10) Patent No.: US 12,556,405 B2
(45) Date of Patent: Feb. 17, 2026

(54) ESTABLISHING AND MAINTAINING TRUSTED COMMUNICATION CHANNELS BETWEEN MICROSERVICES

(71) Applicant: International Business Machines Corporation, Armonk, NY (US)

(72) Inventors: Wojciech Ozga, Zurich (CH); Tamas Visegrady, Zurich (CH); Patricia M. Sagmeister, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 18/539,114

(22) Filed: Dec. 13, 2023

(65) Prior Publication Data

US 2025/0202712 A1    Jun. 19, 2025

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 9/3268* (2013.01)

(58) Field of Classification Search
None
See application file for complete search history.

(56) References Cited

U.S. PATENT DOCUMENTS

| | | | |
|---|---|---|---|
| 9,747,129 B2 | 8/2017 | Osborne et al. | |
| 9,887,975 B1* | 2/2018 | Gifford | H04W 12/0431 |
| 2012/0266213 A1 | 10/2012 | Spiers et al. | |
| 2022/0329442 A1* | 10/2022 | Bulusu | H04L 63/0823 |
| 2022/0385467 A1 | 12/2022 | Ramadasse et al. | |
| 2022/0385483 A1* | 12/2022 | Tschofenig | H04L 9/0877 |
| 2024/0069909 A1* | 2/2024 | Al-Fardan | G06F 8/61 |
| 2024/0134702 A1* | 4/2024 | Ghosh | G06F 9/44505 |
| 2024/0202318 A1* | 6/2024 | Ambrosi | G06F 21/54 |

FOREIGN PATENT DOCUMENTS

| | | |
|---|---|---|
| CN | 120151170 A | 6/2025 |
| WO | 2018120042 A1 | 7/2018 |

OTHER PUBLICATIONS

Walsh, K. and Manferdelli, J., 2017, December. Mechanisms for mutual attested microservice communication. In Companion Proceedings of the 10th International Conference on Utility and Cloud Computing (pp. 59-64). (Year: 2017).*

(Continued)

*Primary Examiner* — Kari L Schmidt
*Assistant Examiner* — Edward X Long
(74) *Attorney, Agent, or Firm* — Zilka-Kotab, P.C.

(57) ABSTRACT

A CIM, according to one approach, includes: issuing, from a first microservice, a handshake request to a second microservice. In response, a verification request is received at the first microservice from the second microservice. Moreover, in response to receiving the verification request, a first secure element correlated with the first microservice produces credentials associated with the first microservice. The first secure element signs the credentials using a cryptographic key assigned to the first microservice. Furthermore, the signed credentials are sent to the second microservice.

13 Claims, 6 Drawing Sheets

(56) References Cited

OTHER PUBLICATIONS

Jander, K., Braubach, L. and Pokahr, A., 2018. Defense-in-depth and role authentication for microservice systems. Procedia computer science, 130, pp. 456-463. (Year: 2018).*
Ozga et al., "Scalable Attestation of Virtualized Execution Environments in Hybrid- and Multi-Cloud," arXiv, 2023, pp. 1-16, retrieved from https://arxiv.org/pdf/2304.00382.pdf.
Walsh, K., "TLS with Trustworthy Certificate Authorities," The 2nd IEEE Workshop on Security and Privacy in the Cloud (SPC 2016), 2016, 9 pages.
Aziz et al., "Extending TLS with Mutual Attestation for Platform Integrity Assurance," Journal of Communications vol. 9, No. 1, Jan. 2014, pp. 63-72.
Knauth et al., "Integrating Remote Attestation with Transport Layer Security," arXiv, 2019, pp. 1-11, retrieved from https://arxiv.org/abs/1801.05863.
Walsh et al., "Mechanisms for Mutual Attested Microservice Communication," UCC Companion'17, Dec. 2017, pp. 59-64.
Berger et al., "vTPM: Virtualizing the Trusted Platform Module," 15th USENIX Security Symposium, 2006, pp. 305-320.
Goldman et al., "Linking Remote Attestation to Secure Tunnel Endpoints," STC '06: Proceedings of the first ACM workshop on Scalable trusted computing, Nov. 2006, pp. pp. 21-24.
Sailer et al., "Design and Implementation of a TCG-based Integrity Measurement Architecture," Proceedings of the 13th USENIX Security Symposium, Aug. 2004, 18 pages.
Oasis, "PKCS #11 Cryptographic Token Interface Base Specification Version 2.40," Oasis Standard, Apr. 14, 2015, 110 pages, retrieved from https://docs.oasis-open.org/pkcs11/pkcs11-base/v2.40/os/pkcs11-base-v2.40-os.html.

* cited by examiner

ESTABLISHING AND MAINTAINING TRUSTED COMMUNICATION CHANNELS BETWEEN MICROSERVICES

BACKGROUND

The present invention relates to attestation, and more specifically, this invention relates to trusted communication channels between microservices.

As software continues to grow more complex, monolithic architectures become more difficult to deploy. For instance, with monolithic architectures, processes are tightly coupled and run as a single service. While this is relatively straightforward to deploy for simple (non-complex) services, it is notably difficult to deploy more complex services on monolithic architectures. For instance, if one process of a complex service experiences a spike in demand, the entire architecture is scaled to accommodate the increased demand. Adding or improving features in monolithic architectures also becomes increasingly complex as code base grows, thereby limiting further expansion.

In an attempt to address some of these issues, microservice architectures have been introduced. In microservice architectures, an application is built as modular components that run each process of an application as a different microservice. These microservices can be tailored to provide specific functionality depending on the situation. Moreover, microservices can be updated, deployed, and scaled frequently to meet demand for specific functions of an application. This also leads to a distributed architecture which is more resistant to being impacted by failures.

SUMMARY

A computer-implemented method (CIM), according to one approach, includes: issuing, from a first microservice, a handshake request to a second microservice. In response, a verification request is received at the first microservice from the second microservice. Moreover, in response to receiving the verification request, a first secure element correlated with the first microservice produces credentials associated with the first microservice. The first secure element signs the credentials using a cryptographic key assigned to the first microservice. Furthermore, the signed credentials are sent to the second microservice.

A computer program product (CPP), according to another approach, includes: a set of one or more computer-readable storage media, as well as program instructions. The program instructions are collectively stored in the set of one or more storage media. Moreover, the program instructions are for causing a processor set to perform the foregoing CIM.

A computer system (CS), according to yet another approach, includes: a processor set as well as a set of one or more computer-readable storage media. The CS further includes program instructions that are collectively stored in the set of one or more storage media, for causing the processor set to perform the foregoing CIM.

Other aspects and approaches of the present invention will become apparent from the following detailed description, which, when taken in conjunction with the drawings, illustrate by way of example the principles of the invention.

DETAILED DESCRIPTION

Figure 1:
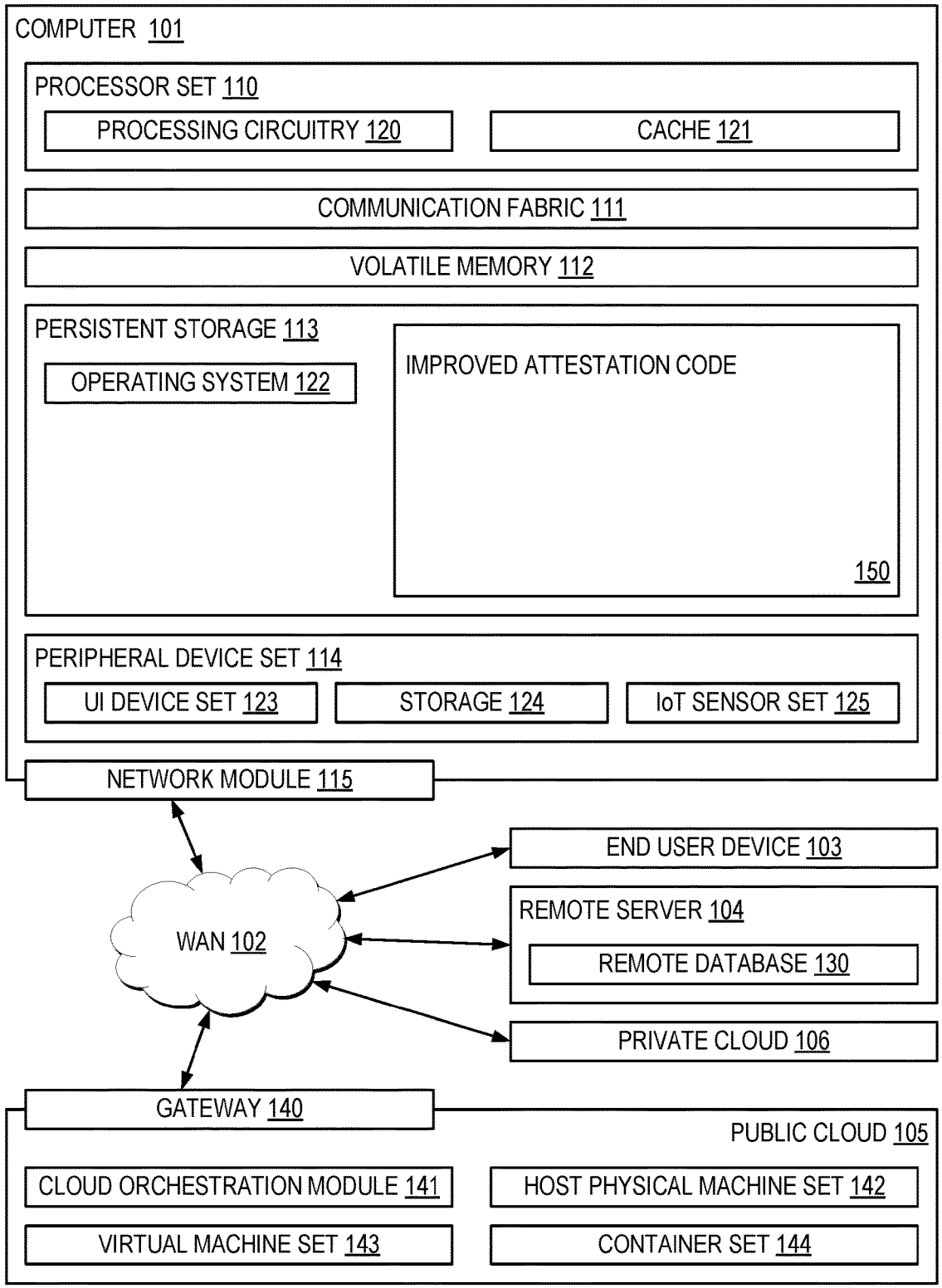
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for performing attestation between microservices by offloading operations to be performed by secure elements correlated with the respective microservices. This process may serve as a preliminary step of establishing a trusted communication channel between the microservices, e.g., that may implement encryption and/or authentication. Approaches herein are desirably able to improve the efficiency with which attestation is performed between microservices. With respect to the present description, it should be noted that "attestation" is intended to refer to a process of proving (e.g., certifying) one or more properties to a third party, e.g., as will be described in further detail below.

In one general approach, a CIM includes: issuing, from a first microservice, a handshake request to a second microservice. In response, a verification request is received at the first microservice from the second microservice. Moreover, in response to receiving the verification request, a first secure element correlated with the first microservice produces credentials associated with the first microservice. The first secure element signs the credentials using a cryptographic key assigned to the first microservice. Furthermore, the signed credentials are sent to the second microservice.

It follows that various approaches herein are able to improve the efficiency with which attestation is performed between microservices. With respect to the present description, it should be noted that "attestation" is intended to refer to a process of proving (e.g., certifying) one or more properties of a system to a third party. For instance, in confidential computing, attestation involves providing proof that an execution environment can be trusted before starting to execute code or before delivering any sensitive data thereto. Thus, by offloading attestation operations from the microservices themselves, to be satisfied by secure elements that are correlated with the respective microservices, approaches herein are able to efficiently establish trusted communication connections between the microservices. Moreover, by evaluating the microservices and identifying changes in real-time, the communication channels can be adjusted accordingly. This allows for approaches herein to generate and dynamically maintain trusted communication channels without impacting performance of the system as a whole.

In some implementations, the first microservice is in a first container at a first data center, while the second microservice is in a second container at a second data center. Producing the credentials associated with the first microservice may thereby include: using an active Platform Configuration Register (PCR) corresponding to the first microservice in the first container to generate the credentials. Producing the credentials associated with the first microservice includes: using an active PCR corresponding to the first microservice in the first container to generate the credentials. Moreover, the active PCR is updated in response to the first microservice and/or the first container being modified. The first secure element generates updated credentials using the updated PCR. The first secure element also signs the updated credentials using the cryptographic key assigned to the first microservice. Furthermore, the signed updated credentials may be sent to the second microservice.

As noted above, offloading attestation operations from the microservices themselves, and utilizing secure elements that are correlated with the respective microservices allows for trusted communication connections to be established and maintained between the microservices in real-time without negatively impacting performance of the system as a whole. This is particularly desirable in view of the shortcomings that have been experienced by conventional products. Thus, using a PCR to generate the credentials improves the efficiency with which attestation is performed between microservices.

In some implementations, the first secure element includes a certificate authority and a policy checker. Furthermore, the certificate authority may be configured to produce the credentials associated with the first microservice. The certificate authority may also be configured to sign the credentials using the cryptographic key assigned to the first microservice.

The policy checker preferably compares the produced credentials to policies that are correlated with the respective microservice. In some approaches, these policies are preassigned to each microservice to at least somewhat control the other microservices that are permitted (e.g., trusted) to connect to a given microservice. For instance, policies may be assigned to microservices during the process of creating the microservices. Moreover, by producing the credentials associated with the first microservice, the certificate authority is able to maintain communication connections between correlated microservices. This desirably improves the operation of the microservices, as well as the overarching services and greater system as a whole.

In some implementations, the CIM further includes issuing a new verification request to the third microservice in response to receiving a second handshake request from a third microservice. In response to receiving signed credentials from the third microservice, the first secure element verifies the signed credentials received from the third microservice. Moreover, verifying the signed credentials received from the third microservice may include causing a policy checker in the first secure element to compare the signed credentials received from the third microservice to a policy assigned to the first microservice.

It follows that implementations herein are able to monitor and maintain multiple different connections at the same time. This desirably expands the improvements achieved herein across various microservices, even in situations where the microservices are regularly updated, migrated over time, referenced by new microservices, etc. Each of these changes impact existing connections between the microservices, and are factored into determining whether each connection remains viable (e.g., trusted). In contrast, conventional products have been unable to efficiently do so, experiencing significant performance setbacks.

In some implementations, the CIM further includes issuing a new verification request to the third microservice in response to receiving a second handshake request from a third microservice. In response to receiving signed credentials from the third microservice, the first secure element verifies the signed credentials received from the third microservice. Verifying the signed credentials received from the third microservice may include causing a policy checker in the first secure element to compare the signed credentials received from the third microservice to a policy assigned to the first microservice. Moreover, verifying the signed credentials received from the third microservice may further include satisfying the second handshake request by establishing a communication channel between the first microservice and the third microservice in response to the policy checker determining the signed credentials received from the third microservice satisfies the policy assigned to the first microservice.

Again, implementations herein are able to monitor and maintain connections between different microservices at the same time. These connections between microservices are based at least in part on policies that are assigned to the respective microservices and used to determine whether connections should be established and/or maintained. This desirably expands the improvements achieved herein across various microservices, even in situations where the microservices are regularly updated, migrated over time, referenced by new microservices, etc.

In some implementations, the CIM further includes issuing a new verification request to the third microservice in response to receiving a second handshake request from a third microservice. In response to receiving signed credentials from the third microservice, the first secure element verifies the signed credentials received from the third microservice. Verifying the signed credentials received from the third microservice may include causing a policy checker in the first secure element to compare the signed credentials received from the third microservice to a policy assigned to the first microservice. Moreover, verifying the signed credentials received from the third microservice may further include rejecting the second handshake request in response to the policy checker determining the signed credentials received from the third microservice does not satisfy the policy assigned to the first microservice.

As noted above, monitoring and maintaining connections between different microservices is based at least in part on policies that are assigned to the respective microservices. These policies are thereby used to determine whether connections should be established and/or maintained. It follows that a communication channel should not be established and/or maintained in situations where a policy has not been met. This desirably avoids situations where communication channels are used to exploit microservices and expose protected information.

In another general approach, a CPP includes: a set of one or more computer-readable storage media, as well as program instructions. The program instructions are collectively stored in the set of one or more storage media. Moreover, the program instructions are for causing a processor set to perform any combination of the foregoing methodologies. It follows that CPPs are able to achieve the improvements described above by performing the combinations of the foregoing methodologies.

In yet another general approach, a CS includes: a processor set as well as a set of one or more computer-readable storage media. The CS further includes program instructions that are collectively stored in the set of one or more storage media, for causing the processor set to perform any combination of the foregoing methodologies. It follows that CSs are able to achieve the improvements described above by performing the combinations of the foregoing methodologies.

A particular application of an approach can be using the CIM(s) as described above to determine whether two microservices that are located in different containers of an operating system at an edge node, should be connected over a communication channel. In other words, the CIM(s) as described above may be used to perform attestation between microservices at a given edge node. Each microservice may be connected to a respective secure element having a certificate authority element and a policy checker element. Any of the microservices may request a communication channel with another of the microservices, where the requesting microservice is evaluated to determine whether a trusted connection should be established therewith. As noted above, this determination is made at least in part by comparing certified (e.g., known) information about a requesting microservice to determine whether it should be communicated with. This process may serve as a preliminary step of establishing a trusted communication channel between the microservices, e.g., that may implement encryption and/or authentication.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved attestation code at block 150 for performing attestation between microservices by offloading operations to be performed by secure elements correlated with the respective microservices. This process may serve as a preliminary step of establishing a trusted communication channel between the microservices, e.g., that may implement encryption and/or authentication.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine (VM) set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of VMs from VM set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are VMs and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As previously mentioned, software continues to grow more complex, making monolithic architectures more difficult to deploy. For instance, with monolithic architectures, processes are tightly coupled and run as a single service. While this is relatively straightforward to deploy for simple (non-complex) services, issues quickly arise as more complex services are deployed on monolithic architectures. For instance, if one process of a complex service experiences a spike in demand, the entire architecture must be scaled to accommodate the increased demand. Adding or improving features in monolithic architectures also becomes increasingly complex as code base grows, thereby limiting further expansion.

In an attempt to address some of these issues, microservice architectures have been introduced. In microservice architectures, an application is built as modular components that run each process of an application as a different microservice. These microservices can be tailored to provide specific functionality depending on the situation. Moreover, microservices can be updated, deployed, and scaled as desired, e.g., to meet demand for specific functions of an application. This also leads to a distributed architecture which is more resistant to being impacted by failures.

While architectures that support microservices introduce a number of desirable traits, conventional products have suffered from undesirable performance. For instance, conventional products have struggled with establishing and maintaining trusted connections between active microservices. As noted above, microservices are regularly updated, migrated over time, referenced by new microservices, etc. Each of these changes impact existing connections between the microservices, and must be factored into determining whether each connection remains trusted. For instance, the "Zero Trust" principle is a high level strategy used to build trustworthy distributed systems. This strategy assumes that entities attempting to access resources, even from inside the same network, cannot automatically be trusted. Each entity is thereby authenticated and attested to before it is trusted and allowed to join a system's network, receive confidential data, perform computation tasks, etc. However, conventional products have been unable to efficiently and securely do so, experiencing significant performance setbacks.

In sharp contrast to these conventional shortcomings, approaches herein are desirably able to improve the efficiency and security with which attestation is performed between microservices. For instance, by offloading attestation operations from the microservices themselves, and utilizing secure elements that are correlated with the respective microservices, approaches herein are able to establish and maintain trusted communication connections between the microservices in real-time without impacting performance and security of the system as a whole. Traditionally, credentials (e.g., password, cryptographic keys such as a TLS private key, etc.) are stored in the memory of a service. Thus, if the service is compromised, an attacker can steal these credentials and impersonate the service. Secure elements instead store these credentials in their memory, which is not directly accessible to services. A service can only request the secure element from a secure element to perform a cryptographic operation with credentials, but does not have direct access to them. Approaches herein also implement short lived credentials that are frequently regenerated to limit the risk of leakage (e.g., being exposed). This is feasible because security elements recreate these credentials automatically, thereby removing a central entity (e.g., admin, key management service, etc.) from the process of recreating credentials and distributing them, e.g., as will be described in further detail below.

Figure 2A:
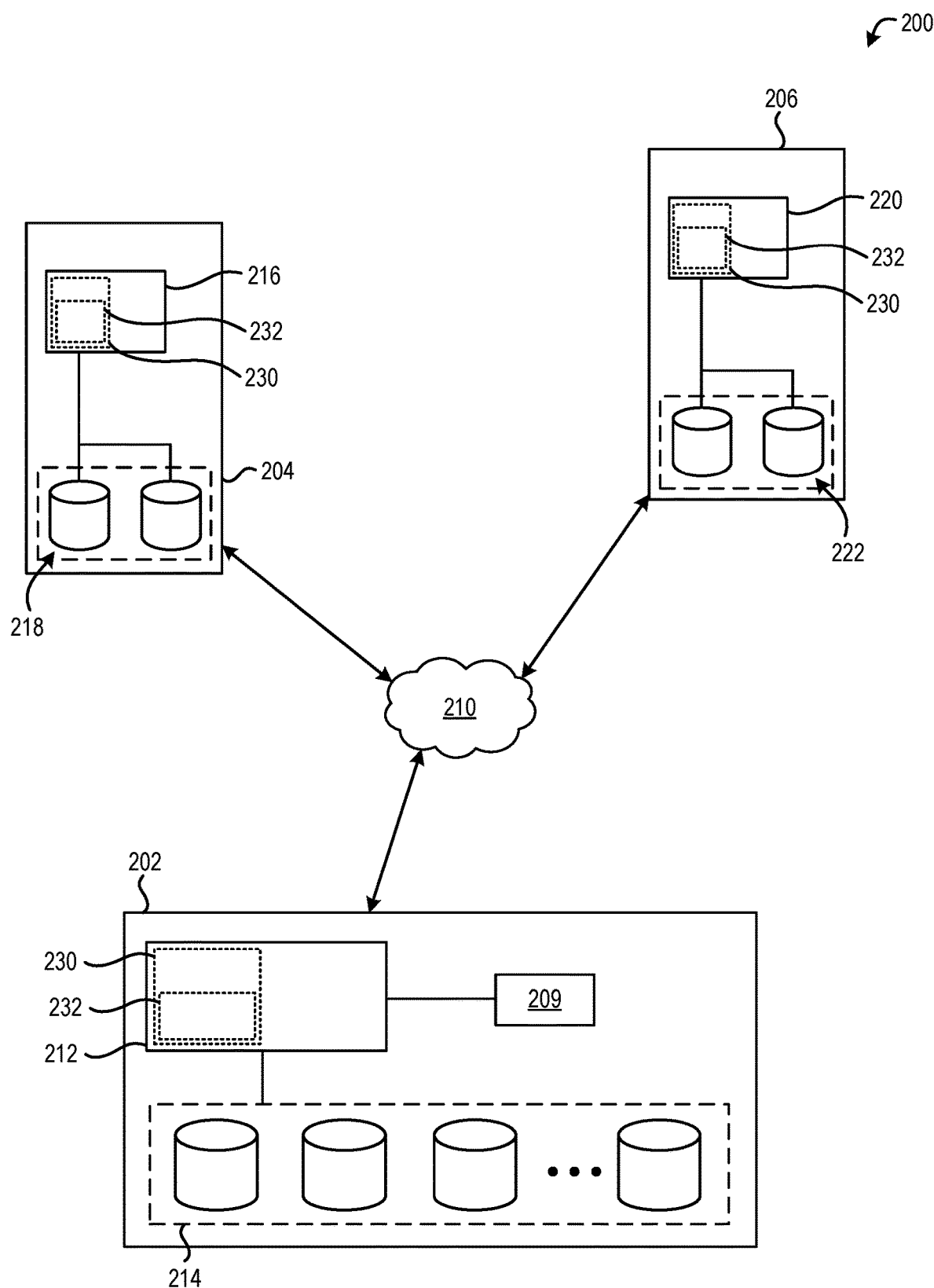
FIG. 2A is a representational view of the components in a distributed system, in accordance with one approach.
Figure 2B:
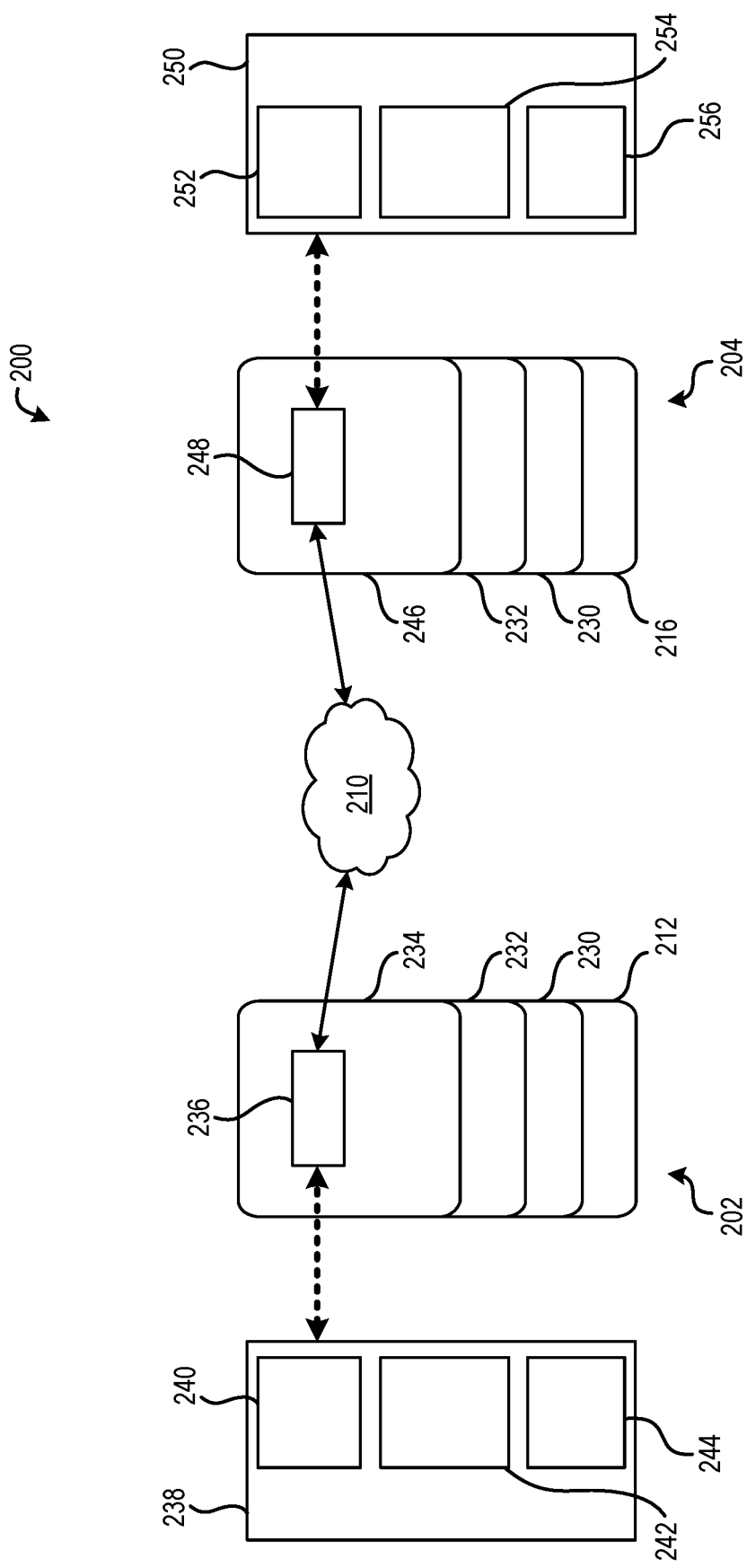
FIG. 2B is a more detailed logical view of the components in FIG. 2A, in accordance with one approach.

Looking now to FIGS. 2A-2B, a representational view of a distributed system 200 that is configured as a container orchestration platform is shown in accordance with one approach. Specifically, FIG. 2A provides a representational view of the physical components that are included in the distributed system 200 in accordance with one approach. FIG. 2B illustrates a more detailed view of the interactions between two of the microservices 236, 248 that run as part of the execution environment 230, 232 presented in FIG. 2A.

However, this is in no way intended to be limiting, and one or more of the components shown in FIGS. 2A-2B may be implemented differently in other approaches. According to an example, physical components may be replaced with corresponding virtual elements. For instance, one or more of the processors in FIG. 2A may be replaced by virtual processors in some approaches. In other approaches, one or more of the physical processor components may be replaced by containers or VMs.

It should also be noted that the present system 200 may be implemented in conjunction with features from any other approach listed herein, such as those described with reference to the other FIGS. However, this system 200 and others presented herein may be used in various applications and/or in permutations which may or may not be specifically described in the illustrative approaches or implementations listed herein. Further, the system 200 presented herein may be used in any desired environment. Thus, FIGS. 2A-2B (and the other FIGS.) may be deemed to include any possible permutation.

As shown in FIG. 2A, the distributed system 200 includes a number of physical components therein. For instance, the system 200 is illustrated as including a central node 202 that is connected to a first node 204 and a second node 206. Specifically, the central node 202, first node 204, and second node 206 are each connected to a network 210. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc., may be sent between the nodes 204, 206, and/or 202, regardless of the amount of separation which exists therebetween, e.g., despite being positioned at different geographical locations.

It should also be noted that two or more of the nodes 204, 206, 202 may be connected to each other differently depending on the approach. According to an example, which is in no way intended to limit the invention, two or more edge nodes (e.g., compute nodes) may be located relatively close to each other and connected by a wired connection, e.g., a cable, a fiber-optic link, a wire, etc., or any other type of connection which would be apparent to one skilled in the art after reading the present description.

With continued reference to FIG. 2A, the first and second nodes 204, 206 may have a different configuration than the central node 202. For instance, the first and second nodes 204, 206 may be edge nodes, while the central node 202 serves as a central location that offers scalable cloud computing and/or data storage. Accordingly, the first node 204 includes a processor 216 coupled to memory 218, and second node 206 includes a processor 220 coupled to memory 222, while central node 202 includes a large (e.g., robust) processor 212 that is coupled to a cache 209 and a data storage array 214 having a relatively high storage capacity (e.g., at least a higher storage capacity than the cache 209). The central node 202 is thereby able to process and store a relatively large amount of data, allowing it to be connected to, and manage, multiple different remote nodes (e.g., edge node servers).

Each of the processors 212, 216, 220 may be able to manage one or more operating systems (OSs) at the respective node locations 202, 204, 206. For instance, processors that support virtualization may include a host OS as well as a guest OS. As such, processors 212, 216, 220 are shown as supporting host OS 230 in addition to guest OS 232. While the OSs 230, 232 are numbered and depicted the same in each of the processors 212, 216, 220, this is in no way intended to be limiting. In other words, each of the processors 212, 216, 220 may implement any desired types and/or configuration of OSs therein. According to a non-limiting example, processor 212 may implement a first type of host OS and a first type of guest OS, while processor 216 implements a second type of host OS and a second type of guest OS. In another non-limiting example, processors that do not support virtualization may only implement a host OS.

Each of the processors 212, 216, 220 may also include a number of containers in the OSs 230, 232. In the present approach, the guest OS 232 may include multiple different containers. Each of the containers can be used to run small microservices, software process, larger applications, etc. Each container may thereby include the executables, binary code, libraries, and configuration files associated with performing a microservice, software process, larger application, etc. However, in other approaches a microservice may run directly in a VM, or in a container of a VM, e.g., as would be appreciated by one skilled in the art after reading the present description. It should be noted that with respect to the present description, "microservices" are intended to refer to modular services, each of which supports a specific task in a larger collective application. In other words, a larger application may be broken into specific tasks, each of which may be accomplished by a different microservice.

Referring now to FIG. 2B, a more detailed view of the containers and corresponding microservices are shown in accordance with one approach. Looking first to central node 202, the host OS 230 and guest OS 232 are run on processor 212. Furthermore, container 234 includes a microservice 236. The microservice 236 may be configured to provide specific functionality depending on the desired approach. Moreover, the microservice 236 can be updated, deployed, and scaled as desired, e.g., to meet demand for specific functions of an application. Processor 216 at node 204 similarly includes host OS 230 and guest OS 232, which include container 246 and microservice 248.

Microservice 236 is also shown as sharing a connection with a secure element 238, while microservice 248 is connected to secure element 250. Microservice 236 and secure element 238 may thereby communicate with each other by sending data, requests, responses, etc. therebetween. Similarly, microservice 248 and secure element 250 may communicate with each other by sending data, requests, responses, etc. therebetween. In some approaches, the secure elements 238, 250 may be assigned to the respective microservices 236, 248 as a part of establishing the microservices. It follows that each microservice is preferably connected to (or "correlated with") a respective secure element. This allows for at least some operations to be offloaded to the secure element. For example, the secure element may be used to perform attestation in response to a communication request being received, e.g., as will be described in further detail below.

Depending on the approach, communication (e.g., the exchange of information) between a microservice and a corresponding secure element may be achieved using different types of connections depending on the particular approach. For example, in some approaches a microservice is software that is executed by a physical computer, while the secure element is a chip that is connected to the motherboard of the physical computer. The microservice may thereby have access to, and communicate with, the secure element via a direct physical connection to the chip in hardware. In other approaches, a microservice may be implemented in a virtual environment (e.g., a cloud environment). Thus, the microservice may be executed in a VM, while the secure element is a physical component that may be exposed to the VM. In other approaches, a process may actually be implementing a secure element that can run on a host operating system and be exposed to a VM. The VM and processor may further have access to a shared memory through a hypervisor, over a network connection, etc. In still other approaches, a microservice may be software that is executed in a confidential computing environment. The microservice may thereby be able to establish access to another process (e.g., the secure element) implemented in the confidential computing environment as a result of satisfying some attestation procedure.

Referring still to FIG. 2B, secure elements 238, 250 each include a respective policy checker element 240, 252, and a respective certificate authority element 242, 254. The secure elements 238, 250 also each include a respective PCR 244, 256. Each of the PCRs 244, 256 may thereby include a plurality of different values (e.g., hash values) therein which correspond to actively running software. In some approaches, one or both of the secure elements 238, 250 are physical Trusted Platform Modules (TPMs) or physical devices implementing the entire or a subset of the TPM specification. According to a non-limiting example, a hardware security module may implement at least a subset of the TPM specification. In turn, this allows the hardware security module to virtualize a desired number of TPMs, e.g., as would be appreciated by one skilled in the art after reading the present description. However, in other approaches one or both of the secure elements 238, 250 are virtual TPMs.

The policy checker elements 240, 252 are each preferably configured to complete at least a portion of a handshake request. This may be achieved by comparing information associated with (e.g., credentials received from) the source of a handshake request to one or more policies that outline specific criteria used to determine whether the handshake request should be accepted. Each of the different policy checker elements 240, 252 may include the same, similar, and/or different policies from each other. The policy checker elements 240, 252 may thereby be adjusted to apply a desired set of policies while evaluating handshake request information.

For instance, in some approaches a policy may define that only handshake requests received from other microservices running in a same data center may be accepted. In other approaches, a policy may outline that handshake requests received from other microservices running in a specific OS and firmware may be accepted. This may be determined using boot measurements of Unified Extensible Firmware Interface (UEFI) and OS on a host machine. In another approach, a policy may outline that handshake requests received from other microservices running in a specific OS in a VM may be accepted. In another approach, a policy may outline that handshake requests received from other microservices running in a specific OS in a container may be accepted. In another approach, a policy may outline that handshake requests received from a host machine associated with a particular entity (e.g., organization, user, application, etc.) may be accepted. This may be determined using a hash of the particular entity in a PCR of the host machine. In another approach, a policy may outline that handshake requests received from a VM associated with a particular entity (e.g., organization, user, application, etc.) may be accepted. In another approach, a policy may outline that handshake requests received at a first microservice from other microservices that accept handshake requests from the first microservice may be accepted. In another approach, a policy may outline that handshake requests received from predetermined physical locations may be accepted. For example, the policy may outline that handshake requests received at a first microservice from microservices being executed in a same data center as the first microservice may be accepted.

The certificate authority elements 242, 254 are each preferably configured to generate information used to verify identity during a handshake request. In some approaches, the certificate authority elements 242, 254 may each be configured to generate credentials that correspond to a desired cryptographic protocol. For example, the certificate authority elements 242, 254 may each be configured to generate Transport Layer Security (TLS) credentials including a current PCR. However, in other approaches a TLS credential may contain hashes from multiple PCRs. Thus, a TLS credential may be generated to include a subset of PCRs. The certificate authority elements 242, 254 are also each preferably configured to automatically generate updated credentials in response to the current PCR being modified (e.g., updated). The certificate authority elements 242, 254 are thereby able to maintain communication connections between correlated microservices despite updates being made to the microservices themselves and/or the containers they are running in. This desirably improves the operation of the microservices, as well as the overarching services and greater system as a whole.

The PCRs 244, 256 store information correlated with the respective microservices 236, 248. In some approaches, the PCRs 244, 256 each accumulate multiple hash values that correspond to (e.g., define) software currently being run in the respective containers 234, 246. For instance, the PCRs 244, 256 may each aggregate fingerprints therein which correspond to the microservices 236, 248 (and other software) running in the respective containers 234, 246. In other words, the aggregated fingerprints in a PCR describe the software currently being executed in a correlated portion of the system, the configuration of the software being executed, the version of the software being executed, the data center that is executing the software, the owner of the software being executed, etc. The information included in the fingerprints may thereby be used to create credentials. According to one example, which is in no way intended to be limiting, the information in a current PCR may be included in produced TLS credentials, e.g., as would be appreciated by one skilled in the art after reading the present description.

Again, although architectures that support microservices introduce a number of desirable traits, conventional products have suffered from degraded performance. For instance, conventional products have struggled with establishing and maintaining trusted connections between active microservices. For instance, conventional products perform integrity attestation in a separate step which can only be performed if the system or platform implements such a feature using TPMs, vTPMs, or other elements. As noted above, microservices are regularly updated, migrated over time, referenced by new microservices, etc. Each of these changes impact existing connections between the microservices, and must be factored into determining whether each connection remains viable (e.g., trusted). However, conventional products have been unable to efficiently do so, experiencing significant performance setbacks.

In sharp contrast to these conventional shortcomings, approaches herein are desirably able to improve the efficiency with which attestation is performed between microservices. With respect to the present description, it should be noted that "attestation" is intended to refer to a process of proving (e.g., certifying) one or more properties of a system to a third party. For instance, in confidential computing, attestation involves providing proof that an execution environment can be trusted before starting to execute code or before delivering any sensitive data thereto. Thus, by offloading attestation operations from the microservices themselves, to be satisfied by secure elements that are correlated with the respective microservices, approaches herein are able to efficiently establish trusted communication connections between the microservices. Moreover, by evaluating the microservices and identifying changes in real-time, the communication channels can be adjusted accordingly. This allows for approaches herein to generate and dynamically maintain trusted communication channels without impacting performance of the system as a whole, e.g., as will be described in further detail below.

Figure 3A:
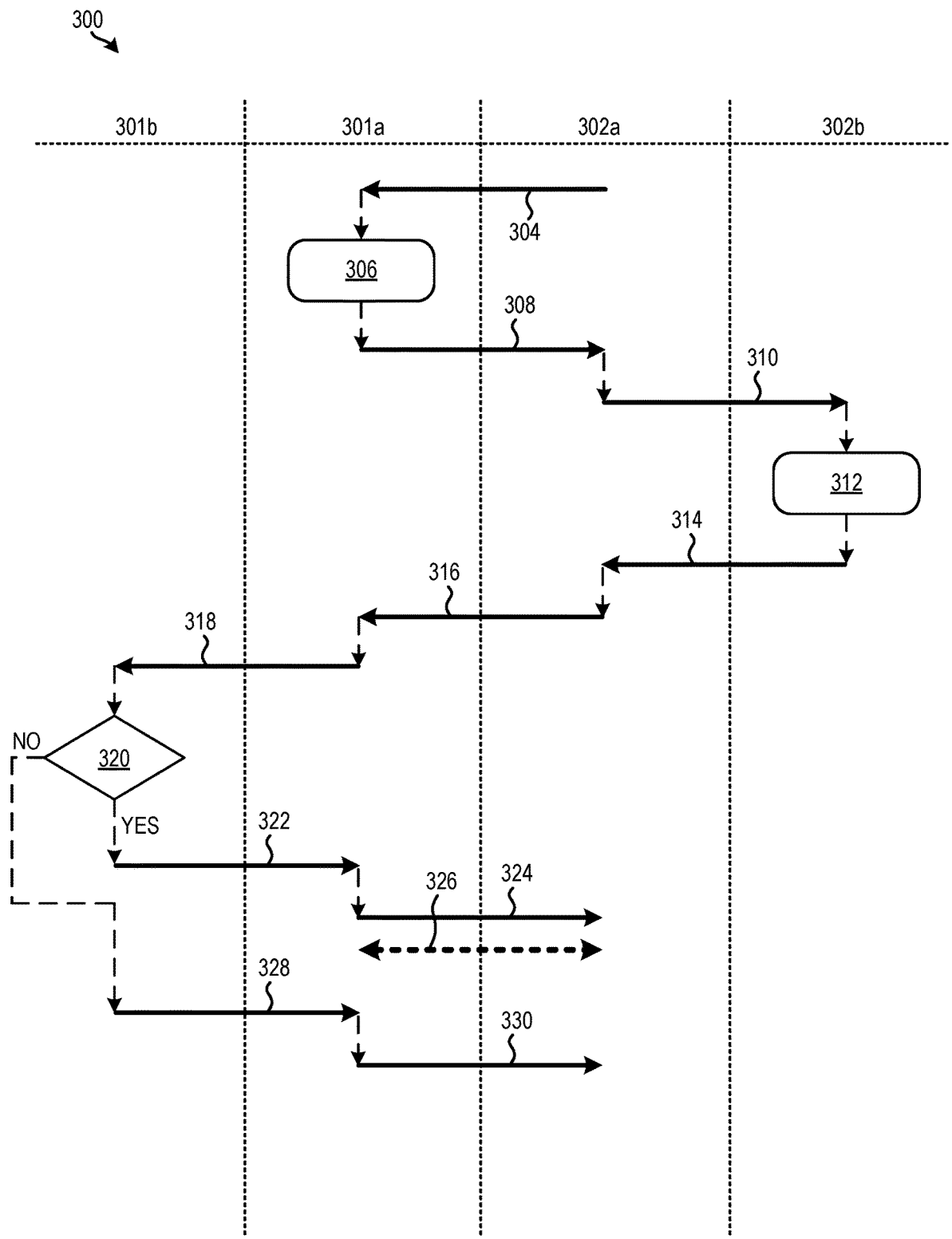
FIG. 3A is a flowchart of a method, in accordance with one approach.

Referring now to FIG. 3A, a computer-implemented method 300 for performing attestation between microservices by offloading operations to be performed by secure elements correlated with the respective microservices, is illustrated in accordance with one approach. This process may serve as a preliminary step of establishing a trusted communication channel between the microservices, e.g., that may implement encryption and/or authentication. The method 300 may be performed in accordance with any of the environments depicted in FIGS. 1-2B, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment. Each of the nodes 301a, 301b, 302a, 302b shown in the flowchart of method 300 may correspond to one or more processors, controllers, computers, etc., positioned at a different location of a distributed system. For instance, node 301a may include one or more virtual processors of a container at a node of a distributed system (e.g., see container 234 of FIG. 2B), while node 301b may include one or more virtual processors of a secure element (e.g., see secure element 238 of FIG. 2B). Furthermore, node 302a may include one or more virtual processors of another container at a different node of the distributed system (e.g., see container 246 of FIG. 2B), while node 302b may include one or more virtual processors of another secure element (e.g., see secure element 250 of FIG. 2B). It follows that commands, data, requests, etc. may be sent between each of the nodes 301a, 301b, 302a, 302b depending on the approach. However, in some approaches communication may not be achieved between a secure element at node 301b and a secure element at node 302b. Moreover, it should be noted that the various processes included in method 300 are in no way intended to be limiting, e.g., as would be appreciated by one skilled in the art after reading the present description. For instance, data sent from node 302a to node 301a may be prefaced by a request sent from node 301a to node 302a in some approaches.

In various implementations, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Looking specifically now to the flowchart, a microservice running at node 302a may wish to initiate a communication channel with another microservice running at node 301a. For example, the microservice at node 302a may evaluate and/or apply information output by the microservice running at node 301a. In other words, the microservices at nodes 302a and 301a may be configured to interact in some way. Accordingly, operation 304 includes issuing a handshake request to a microservice running at node 301a. As would be appreciated by one skilled in the art after reading the present description, a handshake request may serve as an initial step in establishing a communication channel between two locations. In some approaches, the handshake request sent in operation 304 is a TLS handshake request. However, other types of computing handshake requests may be utilized in different approaches.

In response to receiving the handshake request, node 301a evaluates the request to determine details associated with the handshake that is being proposed. See operation 306. This allows node 301a to identify the type of communication channel that is being requested, the type of information anticipated to be sent along the communication channel, a source of the request, etc.

Operation 308 further includes sending a verification request to the microservice at node 302a. While the initial handshake request may include some information associated with the request, additional details are used to determine whether a trusted communication channel should be established between two microservices. For example, cryptographic keys may be used to verify authenticity of a request that is received, thereby avoiding communication channels with undesired locations.

In response to receiving the verification request at node 301a, one or more instructions are sent to a secure element at node 302b. See operation 310. The one or more instructions sent in operation 310 ultimately instruct the secure element to produce credentials that are associated with the first microservice. For instance, the one or more instructions may be directed to a certificate authority element (e.g., see certificate authority elements 242, 254 of FIG. 2B) in the secure element at node 302b. In other words, node 302a causes credentials to be formed, which represent the microservice running at node 302a, as a result of sending the one or more instructions in operation 310. It follows that in response to receiving the one or more instructions sent in operation 310, operation 312 includes producing the requested credentials at node 302b.

In some approaches, the credentials are produced using information stored in a PCR at node 302b and which is correlated with the microservice at node 302a. For instance, the PCR may aggregate fingerprints therein which correspond to the microservice (and other software) running at node 302a, e.g., in a same container. In other words, the aggregated fingerprints in the PCR describe the software currently being executed in the system, the configuration of the software being executed, the version of the software being executed, the data center that is executing the software, the owner of the software being executed, etc. The information included in the fingerprints may thereby be used to create the credentials. It should also be noted that with respect to the present description, "credentials" are intended to refer to a data structure that provides proof of an asserted identify-based claim. However, the type and/or number of credentials that are used to provide this proof may vary depending on the desired approach. According to one example, which is in no way intended to be limiting, operation 310 includes producing TLS credentials using a current PCR.

Figure 3B:
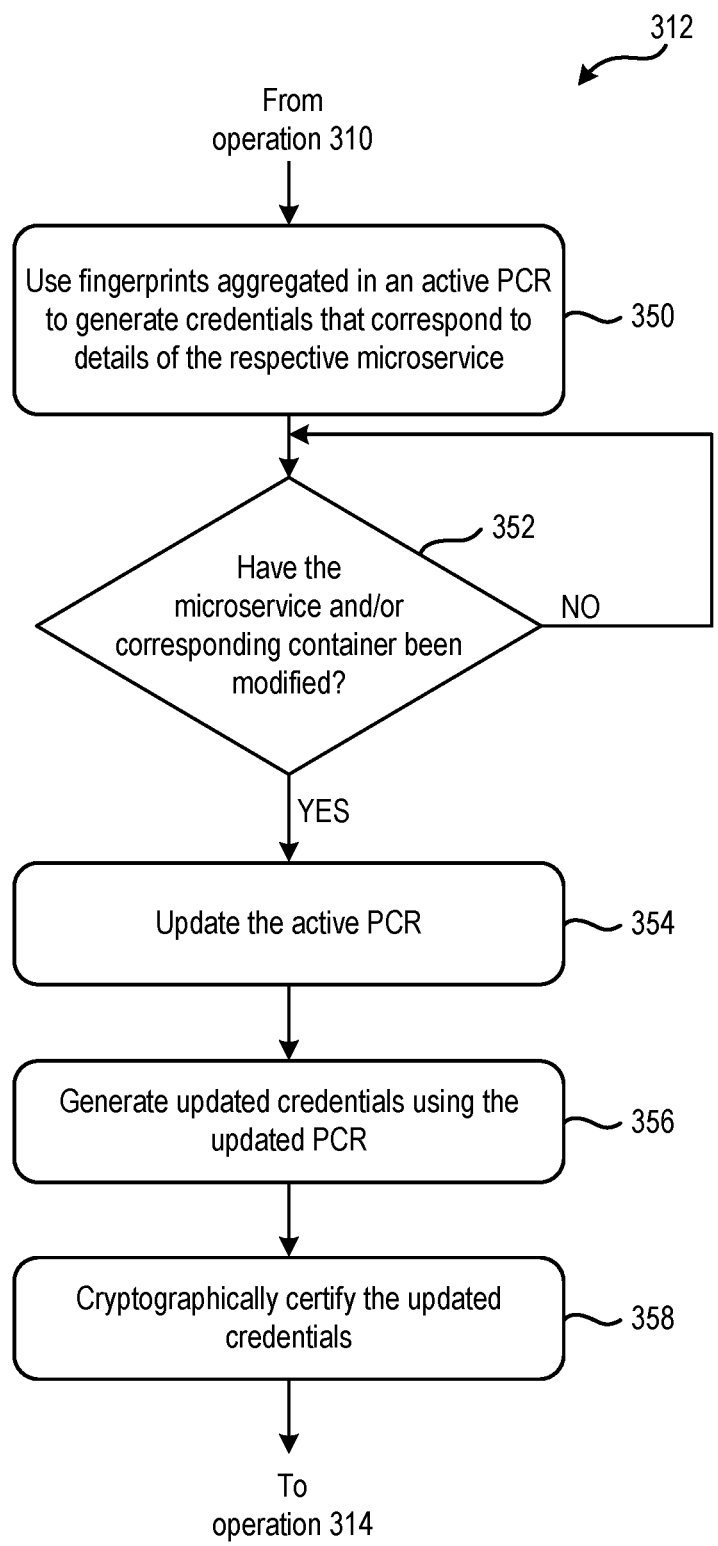
FIG. 3B is a flowchart of sub-operations for one of the operations in the method of FIG. 3A, in accordance with one approach.

Referring momentarily now to FIG. 3B, exemplary sub-operations of producing and maintaining credentials in response to a received verification request are illustrated in accordance with one approach. It follows that one or more of these sub-operations may be used to perform operation 312 of FIG. 3A. However, it should be noted that the sub-operations of FIG. 3B are illustrated in accordance with one approach which is in no way intended to be limiting.

As shown, sub-operation 350 includes using fingerprints that have been aggregated in an active (e.g., current) PCR to generate credentials that correspond to details of the respective microservice. The generated PCRs are thereby up to date (e.g., current) and portray an accurate representation of the respective microservice, e.g., as would be appreciated by one skilled in the art. This may be achieved using any one or more of the approaches described above with respect to FIG. 3A.

While these credentials may provide an accurate representation of the respective microservice at the time the credentials are created, microservices and the containers on which they run may change substantially over time. For example, microservices and/or the containers on which they run may be regularly updated, migrated, referenced by new microservices, etc. Each of these changes impact existing connections between the microservices, and must be factored into determining whether each connection remains trusted.

In order to accommodate these changes and ensure credentials continue to provide an accurate representation over time, sub-operation 352 includes determining whether the respective microservice and/or the corresponding container have been modified since the credentials were formed at sub-operation 350. In response to determining that the microservice and the corresponding container have not been modified since the credentials were formed at sub-operation 350, the flowchart is shown as repeating sub-operation 352. In other words, the microservice and container may continue to be monitored, preferably in real-time. The microservice and container may also be monitored in the background, so as not to impact ongoing performance while also maintaining efficient performance of the system as a whole.

In response to determining that the microservice and/or the corresponding container has been modified since the credentials were formed at sub-operation 350, the flowchart advances to sub-operation 354. There, sub-operation 354 includes updating the active PCR. In other words, information stored in the PCR as representing the microservice and/or the corresponding container is preferably updated such that the PCR maintains an accurate (e.g., updated)

representation. In some approaches, a new PCR may be formed using the modifications made to the microservice and/or container. The newly formed PCR may further be promoted to a "current" version of the PCR, while previous versions of the PCR are downgraded and stored in memory.

Sub-operation 356 includes generating updated credentials using the updated PCR. As noted above, the updated credentials may be generated by a secure element. For instance, in some approaches the updated credentials are generated by a certificate authority in the secure element (e.g., see certificate authority element (e.g., see certificate authority elements 242, 254 of FIG. 2B). Additionally, sub-operation 358 includes cryptographically certifying the updated credentials generated in sub-operation 356. In other words, sub-operation 358 may include signing the updated credentials using a cryptographic key that has been assigned to the microservice being represented by the updated credentials. For instance, the updated credentials may be cryptographically certified by the certificate authority in the secure element (e.g., see certificate authority element (e.g., see certificate authority elements 242, 254 of FIG. 2B).

Cryptographically certifying the updated credentials may add another layer of security to the credentials themselves. This additional security measure may be implemented in situations that call for heightened protection. For example, microservices that use and/or produce sensitive data may be subject to higher standards of care. With respect to the present description, "sensitive data" as used herein may refer to any type of data for which access is to be restricted and/or controlled in some way. For example, sensitive data may include confidential data, data that is to remain within an organization and not shared outside the organization, data that is not to be made available to the public, data that a user wishes to keep private, data that is subject to a higher standard of care as a result of applicable legislation and/or corporate policies (e.g., data associated with children under 13 years of age as specified by the Children's Online Privacy Protection Act), data that is provided confidentially to another user or entity, etc.

Referring still to FIG. 3B, the updated credentials that have been cryptographically signed are preferably sent to a source of the verification request that was originally received. As a result, updates to the microservice and/or container may be reflected in any existing and new communication channels. It follows that the sub-operations of FIG. 3B are able to automatically identify and accommodate any changes that occur during run-time.

Returning back now to FIG. 3A, the credentials that are produced in operation 312 by the secure element at node 302b are returned to the corresponding microservice at node 302a. See operation 314. In some approaches, the credentials may be evaluated to determine authenticity. This allows for changes (e.g., corrections) to be made to the credentials before sending them to a source of the verification request. This desirably avoids unintended breaks in communication between microservices that would otherwise be authorized to communicate with each other.

Proceeding to operation 316, the produced credentials are sent from the microservice at node 302a, to the microservice at node 301a. In response to receiving the credentials, node 301a preferably transfers the credentials to a secure element at node 301b, along with one or more instructions to verify the credentials. See operation 318. In other words, the one or more instructions sent to node 301b cause a respective secure element to verify the signed credentials that have been received. Accordingly, operation 320 includes evaluating the received credentials and determining whether they comply with one or more predetermined policies.

In some approaches a policy checker element (e.g., see policy checker elements 240, 252 of FIG. 2B) in the secure element at node 301b may compare the information that has been certified in the credentials received from the microservice at node 302a to policies that are correlated with the microservice at node 301a. In some approaches, these policies are preassigned to each microservice to at least somewhat control the other microservices that are permitted (e.g., trusted) to connect to a given microservice. For instance, policies may be assigned to microservices during the process of creating the microservices. In some approaches, policies may be modified over time as a result of user input, evaluation of past performance, changing security standards, network bandwidth, etc.

For instance, in some approaches a policy may define that only handshake requests received from other microservices running in a same data center may be accepted. In other approaches, a policy may outline that handshake requests received from other microservices running in a specific OS and firmware may be accepted. This may be determined using boot measurements of Unified Extensible Firmware Interface (UEFI) and OS on a host machine. In another approach, a policy may outline that handshake requests received from other microservices running in a specific OS in a VM may be accepted. In another approach, a policy may outline that handshake requests received from other microservices running in a specific OS in a container may be accepted. In another approach, a policy may outline that handshake requests received from a host machine associated with a particular entity (e.g., organization, user, application, etc.) may be accepted. This may be determined using a hash of the particular entity in a PCR of the host machine. In another approach, a policy may outline that handshake requests received from a VM associated with a particular entity (e.g., organization, user, application, etc.) may be accepted. In another approach, a policy may outline that handshake requests received at a first microservice from other microservices that accept handshake requests from the first microservice may be accepted. In another approach, a policy may outline that handshake requests received from predetermined physical locations may be accepted. For example, the policy may outline that handshake requests received at a first microservice from microservices being executed in a same data center as the first microservice may be accepted.

Referring still to FIG. 3A, method 300 advances from operation 320 to operation 322 in response to determining that the received credentials comply with the predetermined policies. There, operation 322 includes returning an indication that the verification request has been satisfied. In response to receiving the indication, the microservice at node 301a may accept the initial handshake request received in operation 304. See operation 324. As a result of accepting the initial handshake request, a trusted communication channel is created between the microservice at node 301a and the microservice at node 302a. See 326. This allows for the two microservices to exchange information therebetween as desired, allowing for the microservices to achieve a desired result. Preferred approaches are also monitoring the microservices, the containers running the microservices, etc. for changes as they occur over time. By identifying these changes in real-time, approaches herein are able to dynamically update credentials which results in more secure and trustworthy communication channels. Approaches herein are also able to support runtime integrity attestation with asynchronous attestation. Microservices are thereby able to communicate more effectively than has been conventionally achievable.

Returning to operation 320, method 300 advances to operation 328 in response to determining that the received credentials do not comply with one or more of the predetermined policies. There, operation 328 includes returning an indication that the verification request has not been satisfied. In response to receiving the indication, the microservice at node 301a denies the initial handshake request received in operation 304 and may send a corresponding notification back to the requesting microservice at node 302a. See operation 330. As a result of denying (e.g., rejecting) the received handshake request, the microservice at node 302a may be prevented from issuing a subsequent handshake request for a predetermined amount of time, unless a predetermined condition was met, etc.

It follows that method 300 is able to improve the efficiency with which attestation is performed between microservices. For instance, by offloading attestation operations from the microservices themselves, to be satisfied by secure elements that are correlated with the respective microservices, approaches herein are able to efficiently establish trusted communication connections between the microservices. Moreover, by evaluating the microservices and identifying changes in real-time, the communication channels can be adjusted accordingly. This allows for approaches herein to generate and dynamically maintain trusted communication channels without impacting performance of the system as a whole. This also leads to distributed architectures in which each microservice is connected to a respective secure element that is configured to automatically generate and update credentials over time. The credentials thereby support in-use integrity measurements. The secure elements are also configured to verify policies.

It should also be noted that the configuration, number, type, etc. of nodes depicted in FIG. 3A are in no way intended to be limiting. As indicated above, each microservice may communicate with any desired number of other microservices. For example, an operating system implemented at an edge node may include a plurality of containers, each container supporting a different microservice. Each microservice may further be connected to a respective secure element having a certificate authority element and a policy checker element. Each of the microservices may request a communication channel with any other microservices, which in turn evaluate the requesting microservice to determine whether a trusted connection should be established. As noted above, this determination is made at least in part by comparing certified (e.g., known) information about a requesting microservice to determine whether it should be communicated with, e.g., as would be appreciated by one skilled in the art after reading the present description.

Figure 4:
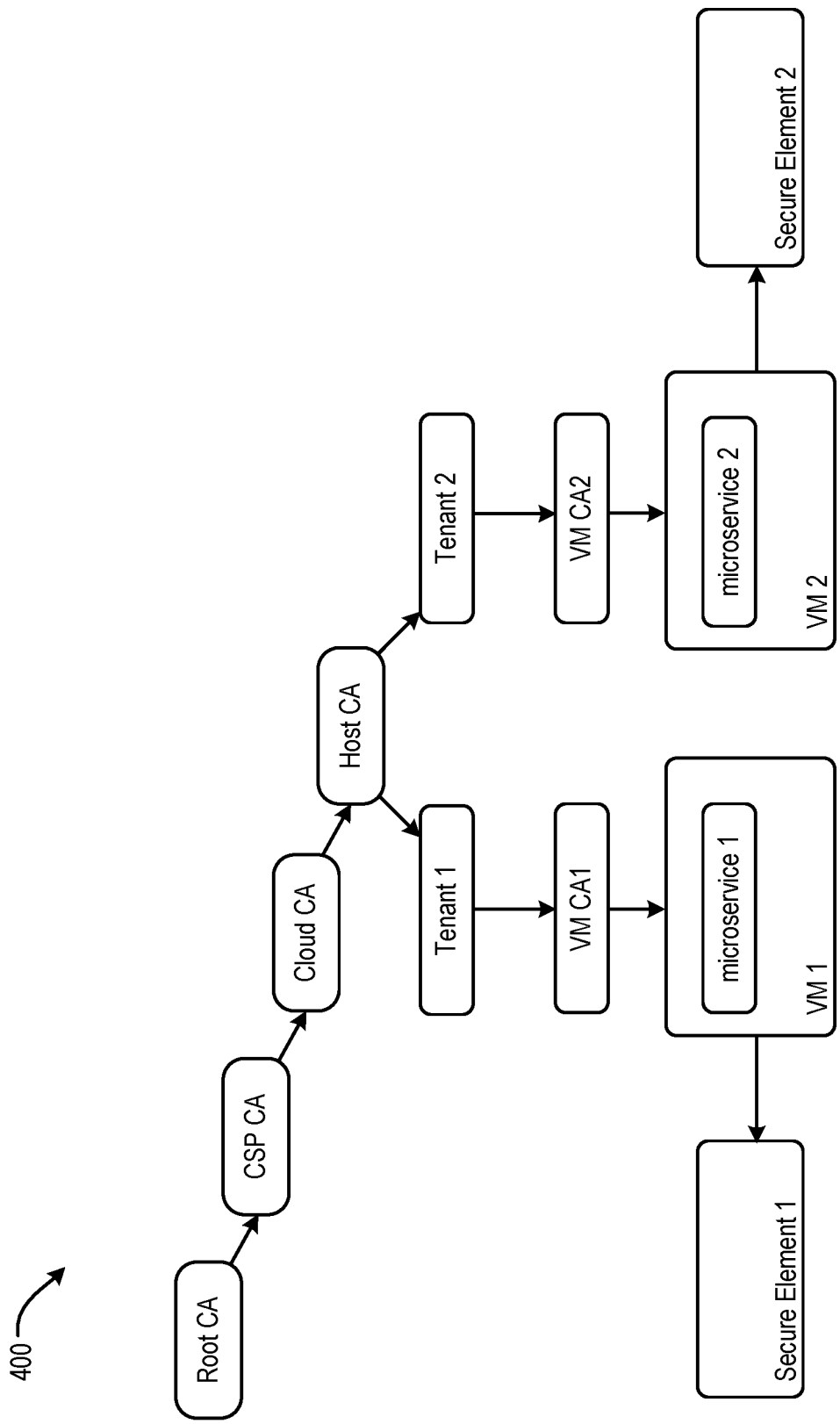
FIG. 4 is a representational view of a logical system, in accordance with one approach.

Looking now to FIG. 4, a logical system 400 is illustrated as being configured to perform attestation between microservices by offloading operations to secure elements correlated with the respective microservices, in accordance with an in-use example which are in no way intended to be limiting.

As shown, the logical system 400 includes a Root certificate authority (CA), which is connected to a communicating sequential processes (CSP) CA, further connected to a Cloud CA, and still further connected to a Host CA. Under the Host CA, a first tenant Tenant 1 and second tenant Tenant 2 are connected to VM CA1 and VM CA2, as well as VM1 and VM2, respectively. VM1 is shown as running microservice 1, while VM2 is shown as running microservice 2. VM1 is also connected to Secure Element 1, while VM2 is connected to Secure Element 2. Each secure element is preferably able to compare policies to received requests, dynamically generate credentials in response to modifications to the microservices and/or VMs, store PCR information, etc., according to any of the approaches herein.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method (CIM), comprising:
issuing, from a first microservice, a handshake request to a second microservice;
receiving, at the first microservice, a verification request from the second microservice;
in response to receiving the verification request, causing a first secure element correlated with the first microservice to produce credentials associated with the first microservice;
causing the first secure element to sign the credentials using a cryptographic key assigned to the first microservice;
sending the signed credentials to the second microservice;
in response to receiving a second handshake request from a third microservice, issuing a new verification request to the third microservice; and
in response to receiving signed credentials from the third microservice, causing the first secure element to verify the signed credentials received from the third microservice,
wherein the verifying of the signed credentials received from the third microservice includes:
causing a policy checker in the first secure element to compare the signed credentials received from the third microservice to a policy assigned to the first microservice, and
in response to the policy checker determining the signed credentials received from the third microservice satisfies the policy assigned to the first microservice, satisfying the second handshake request by establishing a communication channel between the first microservice and the third microservice,
wherein the first microservice is in a first container at a first data center, wherein the second microservice is in a second container at a second data center,
wherein the first secure element is correlated with the first microservice and a second secure element is correlated with the second microservice,
wherein the third microservice is in a third container at a third data center, wherein a third secure element is correlated with the third microservice and produces the signed credentials received from the third microservice.

2. The CIM of claim 1, wherein the first secure element is different than the second secure element.

3. The CIM of claim 1, wherein the producing of the credentials associated with the first microservice includes:
using an active Platform Configuration Register (PCR) corresponding to the first microservice in the first container to generate the credentials.

4. The CIM of claim 3, further comprising:
in response to the first microservice being modified, updating the active PCR;
causing the first secure element to generate updated credentials using the updated PCR;
causing the first secure element to sign the updated credentials using the cryptographic key assigned to the first microservice; and
sending the signed updated credentials to the second microservice.

5. The CIM of claim 1, wherein the first secure element includes a first certificate authority and a first policy checker, wherein the first certificate authority is configured to:
produce the credentials associated with the first microservice, and
sign the credentials using the cryptographic key assigned to the first microservice,
wherein the second secure element includes a second certificate authority and a second policy checker, wherein the second certificate authority is configured to:
produce the credentials associated with the second microservice, and
sign the credentials using the cryptographic key assigned to the second microservice.

6. The CIM of claim 1, wherein the verifying of the signed credentials received from the third microservice further includes:
in response to the policy checker determining the signed credentials received from the third microservice does not satisfy the policy assigned to the first microservice, rejecting the second handshake request.

7. A computer program product (CPP), comprising:
a set of one or more computer-readable storage media; and
program instructions, collectively stored in the set of one or more storage media, for causing a processor set to perform the following computer operations:
issue, from a first microservice, a handshake request to a second microservice;
receive, at the first microservice, a verification request from the second microservice;
in response to receiving the verification request, cause a first secure element correlated with the first microservice to produce credentials associated with the first microservice;
cause the first secure element to sign the credentials using a cryptographic key assigned to the first microservice;
send the signed credentials to the second microservice;
in response to receiving a second handshake request from a third microservice, issue a new verification request to the third microservice; and
in response to receiving signed credentials from the third microservice, cause the first secure element to verify the signed credentials received from the third microservice, wherein the verifying of the signed credentials received from the third microservice includes:
causing a policy checker in the first secure element to compare the signed credentials received from the third microservice to a policy assigned to the first microservice, and
in response to the policy checker determining the signed credentials received from the third microservice satisfies the policy assigned to the first microservice, satisfying the second handshake request by establishing a communication channel between the first microservice and the third microservice,
wherein the first microservice is in a first container at a first data center, wherein the second microservice is in a second container at a second data center,
wherein the first secure element is correlated with the first microservice and a second secure element is correlated with the second microservice,
wherein the third microservice is in a third container at a third data center,
wherein a third secure element is correlated with the third microservice and produces the signed credentials received from the third microservice.

8. The CPP of claim 7, wherein the producing of the credentials associated with the first microservice includes:
using an active Platform Configuration Register (PCR) corresponding to the first microservice in the first container to generate the credentials.

9. The CPP of claim 8, further comprising program instructions, collectively stored in the set of one or more storage media, for causing the processor set to perform the following computer operations:
in response to the first microservice and/or the first container being modified, update the active PCR;
cause the first secure element to generate updated credentials using the updated PCR;
cause the first secure element to sign the updated credentials using the cryptographic key assigned to the first microservice; and
send the signed updated credentials to the second microservice.

10. The CPP of claim 7, wherein the first secure element includes a first certificate authority and a first policy checker, wherein the certificate authority is configured to:
produce the credentials associated with the first microservice, and
sign the credentials using the cryptographic key assigned to the first microservice,
wherein the second secure element includes a second certificate authority and a second policy checker, wherein the second certificate authority is configured to:
produce the credentials associated with the second microservice, and
sign the credentials using the cryptographic key assigned to the second microservice.

11. The CPP of claim 7, wherein the verifying of the signed credentials received from the third microservice further includes:
in response to the policy checker determining the signed credentials received from the third microservice does not satisfy the policy assigned to the first microservice, rejecting the second handshake request.

12. A computer system (CS), comprising:
a processor set;
a set of one or more computer-readable storage media;

program instructions, collectively stored in the set of one or more storage media, for causing the processor set to perform the following computer operations:
issue, from a first microservice, a handshake request to a second microservice;
receive, at the first microservice, a verification request from the second microservice;
in response to receiving the verification request, cause a first secure element correlated with the first microservice to produce credentials associated with the first microservice;
cause the first secure element to sign the credentials using a cryptographic key assigned to the first microservice;
send the signed credentials to the second microservice;
in response to receiving a second handshake request from a third microservice, issue a new verification request to the third microservice; and
in response to receiving signed credentials from the third microservice, cause the first secure element to verify the signed credentials received from the third microservice,
wherein the verifying of the signed credentials received from the third microservice includes:
causing a policy checker in the first secure element to compare the signed credentials received from the third microservice to a policy assigned to the first microservice, and
in response to the policy checker determining the signed credentials received from the third microservice satisfies the policy assigned to the first microservice, satisfying the second handshake request by establishing a communication channel between the first microservice and the third microservice,
wherein the first microservice is in a first container at a first data center, wherein the second microservice is in a second container at a second data center,
wherein the first secure element is correlated with the first microservice and a second secure element is correlated with the second microservice,
wherein the third microservice is in a third container at a third data center,
wherein a third secure element is correlated with the third microservice and produces the signed credentials received from the third microservice.

13. The CS of claim 12, wherein the producing of the credentials associated with the first microservice includes:
using an active Platform Configuration Register (PCR) corresponding to the first microservice in the first container to generate the credentials;
in response to the first microservice being modified, updating the active PCR;
causing the first secure element to generate updated credentials using the updated PCR;
causing the first secure element to sign the updated credentials using the cryptographic key assigned to the first microservice; and
sending the signed updated credentials to the second microservice and the third microservice,
wherein the first secure element includes a first certificate authority and a first policy checker, wherein the first certificate authority is configured to:
sign the credentials using the cryptographic key assigned to the first microservice,
wherein the first secure element is different than the second secure element and the third secure element.

* * * * *